*(12)* United States Patent
Madonna et al.

(10) Patent No.: US 8,369,082 B2
(45) Date of Patent: Feb. 5, 2013

(54) IN-WALL DOCK FOR A TABLET COMPUTER

(75) Inventors: Robert P. Madonna, Osterville, MA (US); Kathleen M. Lacey, Centerville, MA (US); Peter H. Corsini, East Sandwich, MA (US); Michael E. Noonan, Sandwich, MA (US)

(73) Assignee: Savant Systems, LLC, Hyannis, MA (US)

( * ) Notice: Subject to any disclaimer, the term of this patent is extended or adjusted under 35 U.S.C. 154(b) by 255 days.

(21) Appl. No.: 12/850,429

(22) Filed: Aug. 4, 2010

(65) Prior Publication Data

US 2012/0033375 A1 Feb. 9, 2012

(51) Int. Cl.
*G06F 1/16* (2006.01)
*H05K 5/00* (2006.01)
*H05K 7/00* (2006.01)

(52) U.S. Cl. .......... 361/679.41; 361/679.56; 361/679.57

(58) Field of Classification Search .. 361/679.4–679.45, 361/679.55–679.58; 348/837
See application file for complete search history.

(56) References Cited

U.S. PATENT DOCUMENTS

| | | | | |
|---|---|---|---|---|
| 5,267,775 | A * | 12/1993 | Nguyen | 297/217.3 |
| 6,130,727 | A * | 10/2000 | Toyozumi | 348/837 |
| 6,504,710 | B2 * | 1/2003 | Sutton et al. | 361/679.41 |
| 6,739,654 | B1 * | 5/2004 | Shen et al. | 297/188.04 |
| 7,155,214 | B2 | 12/2006 | Struthers et al. | |
| 7,201,354 | B1 * | 4/2007 | Lee | 248/231.9 |
| 7,408,596 | B2 * | 8/2008 | Kunz | 348/837 |
| 7,493,142 | B2 | 2/2009 | Struthers et al. | |
| 7,791,586 | B2 * | 9/2010 | Shalam | 345/108 |
| 7,954,894 | B2 * | 6/2011 | Schedivy et al. | 297/217.3 |
| 2003/0137584 | A1 * | 7/2003 | Norvell et al. | 348/61 |
| 2005/0200697 | A1 * | 9/2005 | Schedivy et al. | 348/61 |

(Continued)

FOREIGN PATENT DOCUMENTS

AT 11 510 U1 11/2011
DE 103 52 906 A1 6/2011
(Continued)

OTHER PUBLICATIONS

Knott, Jason, "iPort Ships In-Wall iPad, iPod Touch Docks," CE Pro, <http://www.cepro.com/article/iport_ships_in_wall_ipad_ipod_touch_docks/>, Jul. 8, 2010, p. 1.

(Continued)

*Primary Examiner* — Jinhee Lee
*Assistant Examiner* — Adrian S Wilson
(74) *Attorney, Agent, or Firm* — Cesari and McKenna, LLP

(57) ABSTRACT

In one embodiment, an in-wall dock for a tablet computer includes a rotatable receiving tray to which a tablet computer is secured. A housing of the in-wall dock is at least partially disposed within a wall cavity of a wall. The receiving tray is rotatably mounted to the housing. The receiving tray is configured to rotate from a first orientation disposed at an acute angle to a front face of the housing to permit engagement of the tablet computer with the receiving tray, to a second orientation that is substantially parallel to the front face of the housing and that prevents removal of the tablet computer from the receiving tray. A lock down mechanism retains the receiving tray in the second orientation. A removable bezel covers at least a portion of a front face of the housing and a front face of the tablet computer.

20 Claims, 7 Drawing Sheets

U.S. PATENT DOCUMENTS

| | | | |
|---|---|---|---|
| 2005/0204596 A1* | 9/2005 | Peng | 40/320 |
| 2006/0052097 A1 | 3/2006 | Struthers et al. | |
| 2006/0109388 A1* | 5/2006 | Sanders et al. | 348/837 |
| 2006/0148575 A1* | 7/2006 | Vitito | 463/46 |
| 2006/0285287 A1* | 12/2006 | Chen et al. | 361/685 |
| 2007/0047198 A1* | 3/2007 | Crooijmans et al. | 361/686 |
| 2007/0052618 A1* | 3/2007 | Shalam | 345/7 |
| 2007/0070192 A1* | 3/2007 | Shalam | 348/61 |
| 2007/0108788 A1* | 5/2007 | Shalam et al. | 296/37.15 |
| 2007/0247800 A1* | 10/2007 | Smith et al. | 361/683 |
| 2010/0014228 A1* | 1/2010 | Quijano et al. | 361/679.01 |
| 2010/0138581 A1* | 6/2010 | Bird et al. | 710/303 |

FOREIGN PATENT DOCUMENTS

| | | |
|---|---|---|
| WO | WO-2005/047786 A1 | 5/2005 |
| WO | WO-2007/056425 A2 | 5/2007 |

OTHER PUBLICATIONS

"iDock iPad® Docking Station: iDock Wall Charging Station: iPad® Storage in a High Quality Environment," iRoom Technical Specifications, retrieved on Aug. 11, 2010, pp. 1-4.

"Notification of Transmittal of the International Search Report and the Written Opinion of the International Searching Authority, or the Declaration," International Filing Date: Jul. 27, 2011, International Application No. PCT/US2011/001322, Applicant: Savant Systems LLC, Date of Mailing: Nov. 7, 2011, pp. 1-12.

"FlexDock—Le-Series Spec Sheet," Motion Computing, http://www.motioncomputing.com/choose/spec_flexdock_LE.htm, Jan. 30, 2010, pp. 1.

"8" In-wall Touchscreen PC-N8WTS Spec Sheet," Nobu, LLC, Oct. 10, 2006, pp. 1-2.

"IW-22 Spec Sheet," iPort, Jan. 7, 2010, pp. 1-2.

"IW-21 Spec Sheet," iPort, Jan. 7, 2010, pp. 1-2.

"IW-20 Spec Sheet," iPort, Dec. 7, 2009, pp. 1-2.

"CEN-IDOCV-DSW Wall Mount Interference for Apple iPod®," Crestron Electronics, Inc., May 30, 2010, pp. 1-3.

"ROSIE In-Wall Media Dock Cut Sheet," Savant Systems, LLC, May 14, 2009, pp. 1-3.

"N8WTS Fanless Inwall Touch Screen PC: User's Manual," vol. v1.2, Nobu, LLC, Jun. 2008, pp. 1-29.

\* cited by examiner

IN-WALL DOCK FOR A TABLET COMPUTER

BACKGROUND

1. Technical Field

The present disclosure relates generally to electronic device mounting and docking systems, and more specifically to an in-wall dock for a tablet computer.

2. Background Information

A variety of control systems have been developed to control and interact with audio/video (A/V) devices, home automation units, lighting control units, telephony devices, heating, ventilation, and air conditioning (HVAC) units, energy management devices, and/or other types of devices. Such control systems often organize control options into a series of menus, and present these menus in user interfaces. While user interfaces may be presented in a variety of manners, touch panel interfaces are particularly popular with many end user.

A variety of special-purpose table-top and portable touch panel control units have been developed to interact with particular control systems. Further, a variety of special-purpose in-wall touch panel control units have been developed to interact with particular control systems. In-wall units may be preferred by end users in certain applications, for example, where close integration into the structure of the home or other building is desired.

Many special-purpose in-wall touch panel control units include advanced computing hardware, in addition, to a touch-sensitive display screen. For example, many special-purpose in-wall touch panel control units include an embedded personal computer (PC), a digital graphics engine, one or more network interface(s), speakers, a microphone and other hardware components. These components may be arranged in a case mounted at least partially into a wall cavity. Due to in part their special-purpose nature, and corresponding often limited production volume, special-purpose in-wall touch panel control units are typically quite expensive. This expense often limits the number of units installed in a typical installation. Often it is simply cost prohibitive to install an individual special-purpose in-wall touch panel control unit in every room of a home or other building, even though an end-user may desire such an arrangement. To reduce costs, the use of unit is often rationed, such that they are installed in only a few key rooms or locations within a home or other building.

If it were possible to utilize a lower-cost mass-market product in place of a special-purpose in-wall touch panel control unit, a greater number of panels could be deployed at a similar expense. However, various problems are encountered when trying to integrate a mass-market product into a wall. For example, it is difficult to mount a product that is not designed for an in-wall installation in a wall in a manner that provides the level of fit-and-finish often demanded by end users. Further, it is difficult to secure a product that is not designed for an in-wall installation in a manner that prevents, or at least discourages, unwanted removal or theft.

Accordingly, there is a need for improved techniques for in-wall mounting.

SUMMARY

In one embodiment, the shortcomings of the prior art are addressed in part by an in-wall dock for a tablet computer that includes a tilting receiving tray that receives and secures the tablet computer. The in-wall dock is secured in a wall of a building via one or more mounting tabs, or other attachment mechanisms, disposed in a housing of the dock. When secured in a wall, a front face of the housing is preferably arranged substantially parallel with the wall surface facing the room, and may overlap a portion of the wall, while the remainder of the housing is disposed within the wall cavity (i.e., the stud bay). One or more connectors may couple the in-wall dock to power and/or data cabling in the wall.

The receiving tray is rotatably mounted to the housing. The receiving tray may be configured to rotate from a first orientation disposed at an acute angle to the front face of the housing, to a second orientation that is substantially parallel to the front face of the housing. While the receiving tray is positioned in the first orientation, the tablet computer may be slid into the receiving tray, and engage one or more power/and or data connectors positioned on the receiving tray. One or more retaining mechanism(s), for example, first and second retaining flanges, retain the tablet computer in the receiving tray. The retaining flanges substantially prevent movement of the tablet computer in directions normal to a major axis of the tablet computer. The receiving tray is then rotated to the second orientation, and secured in this orientation by a lockdown mechanism, for example, by a fastener. While in the second orientation, a front face of the tablet computer is disposed nearly flush, or nearly flush, to the front face of the housing. Inner sidewalls of the housing substantially prevent movement of the tablet computer in directions parallel to the major axis of the tablet computer. As long as the lockdown mechanism is engaged, the tablet computer may not be readily removed, as it is retained in all direction, thereby preventing, or at least discouraging, theft of the tablet computer. Further, an electronic removal detection system, for instance, an electronic contact closure system, may also be used to detect and discourage unwanted removal.

A bezel may be secured to cover the front face of the housing, a portion of a front face of the tablet computer, and a portion of the wall surrounding the dock. The bezel may be secured to the front face via a removable attachment mechanism, for example, by a magnet closure. With the bezel in place, the appearance of the tablet computer in the in-wall dock may approximate the appearance of a special-purpose in-wall touch panel control unit.

It should be understood that various alternative embodiments are possible, and that this summary only describes one possible configuration, of many possible configurations.

BRIEF DESCRIPTION OF THE DRAWINGS

The description below refers to the accompanying drawings of an example embodiment, of which.

DETAILED DESCRIPTION

Figure 1:
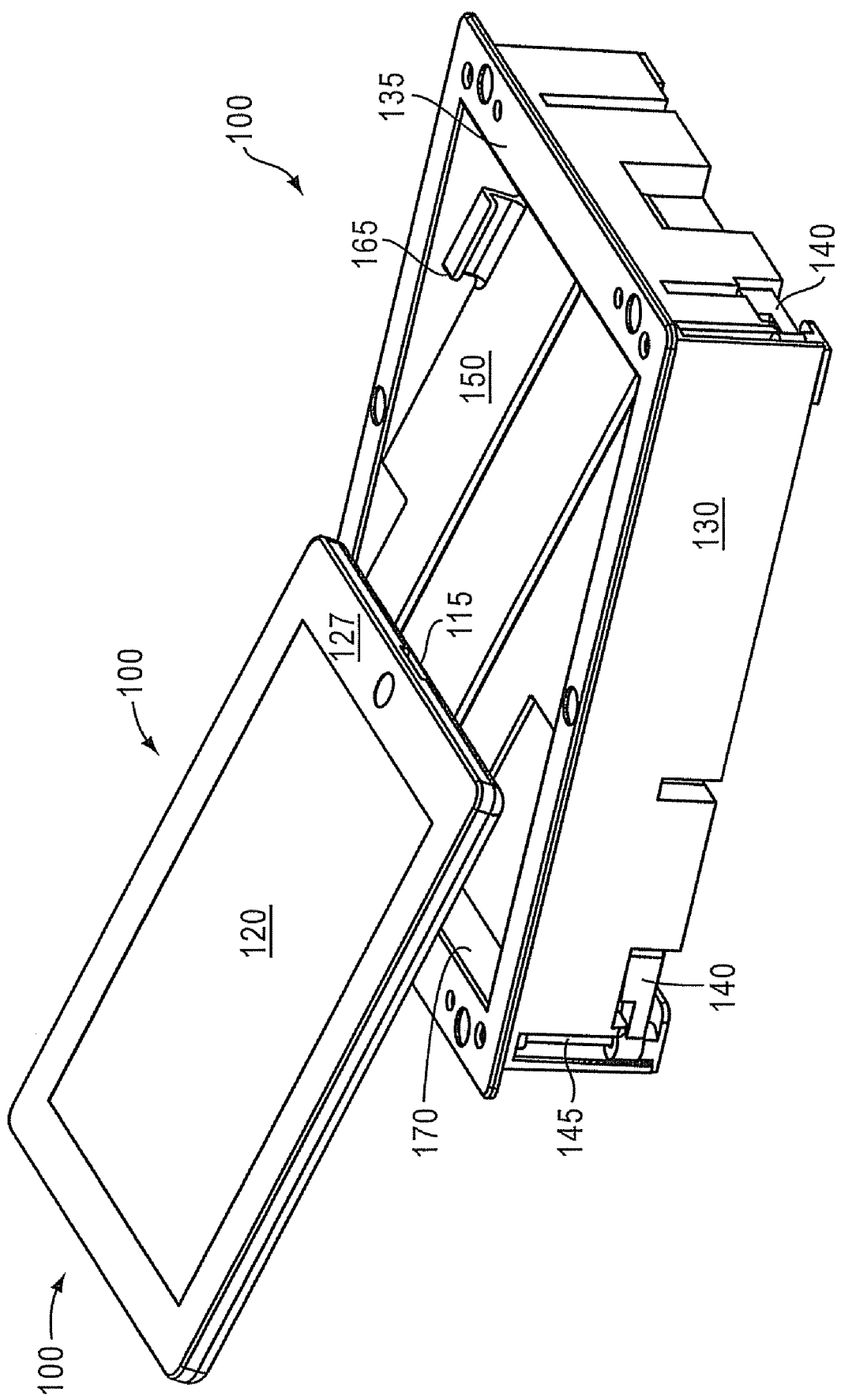
FIG. 1 is a perspective view of an example in-wall dock for a tablet computer showing a tablet computer partially slid into a tilted receiving tray.
Figure 2:
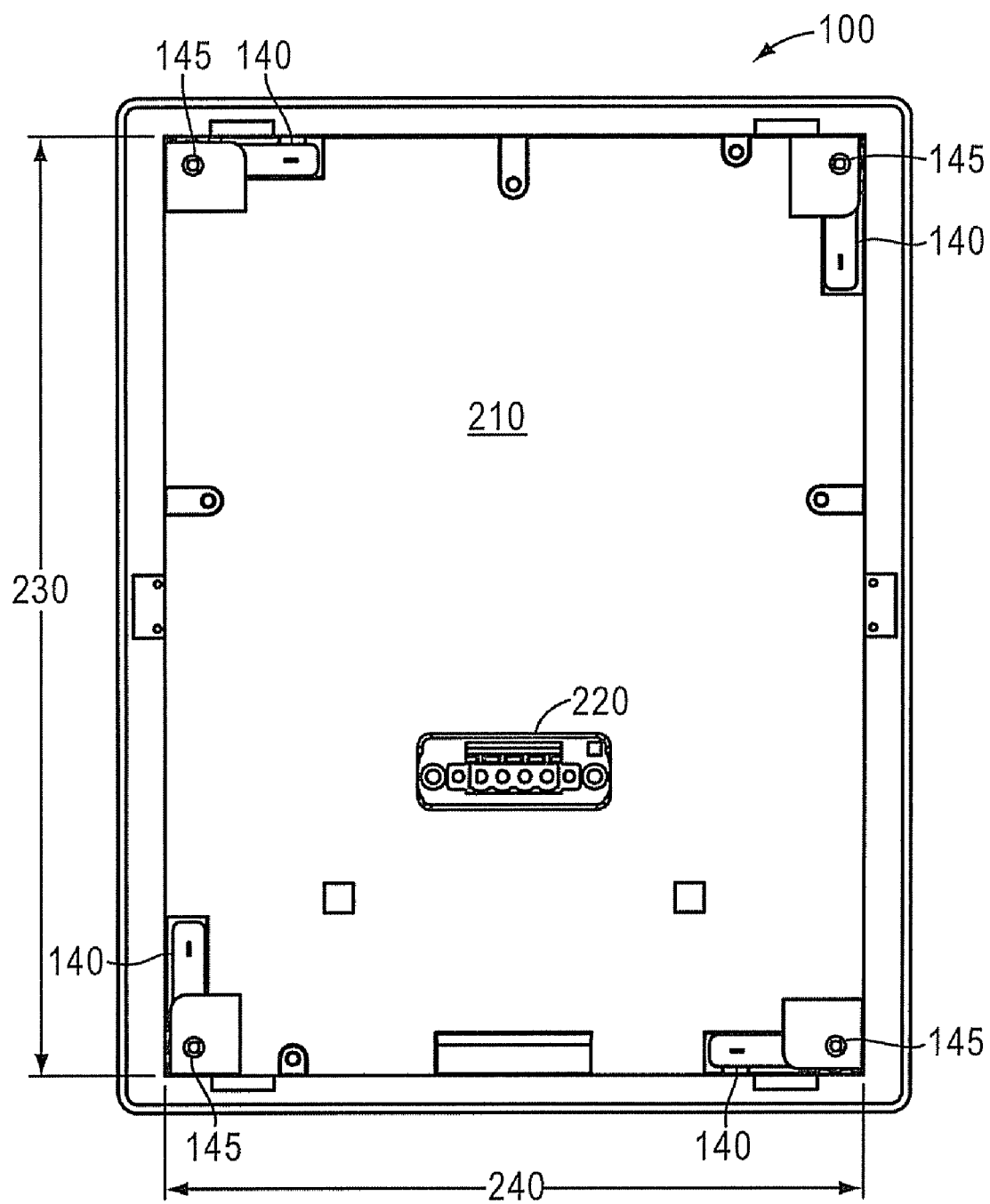
FIG. 2 is a rear plan view of the example in-wall dock of FIG. 1, showing an example connector on a back face of the housing.
Figure 3:
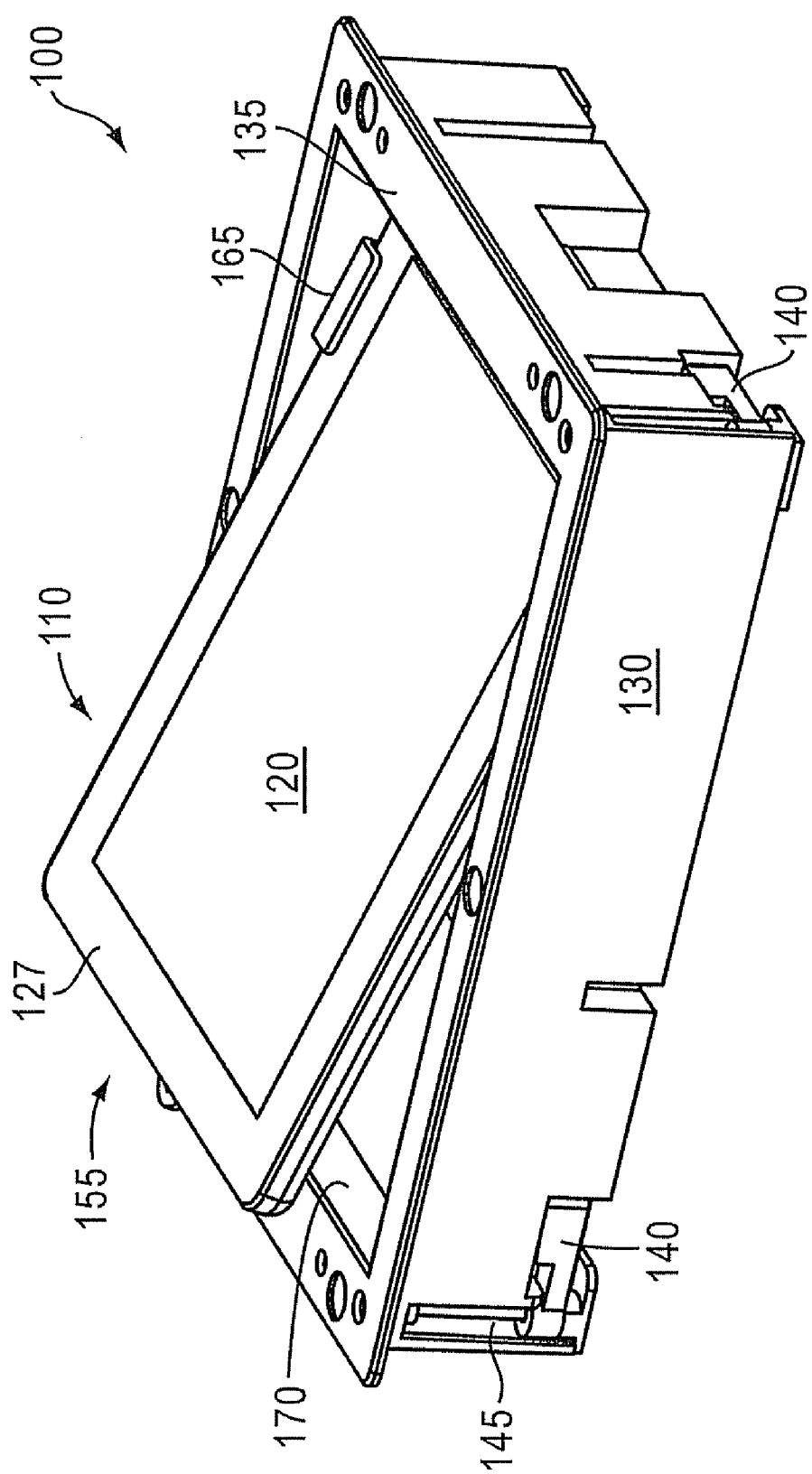
FIG. 3 is a perspective view of the example in-wall dock of FIG. 1 showing the tablet computer fully slid into the tilted receiving tray.
Figure 4:
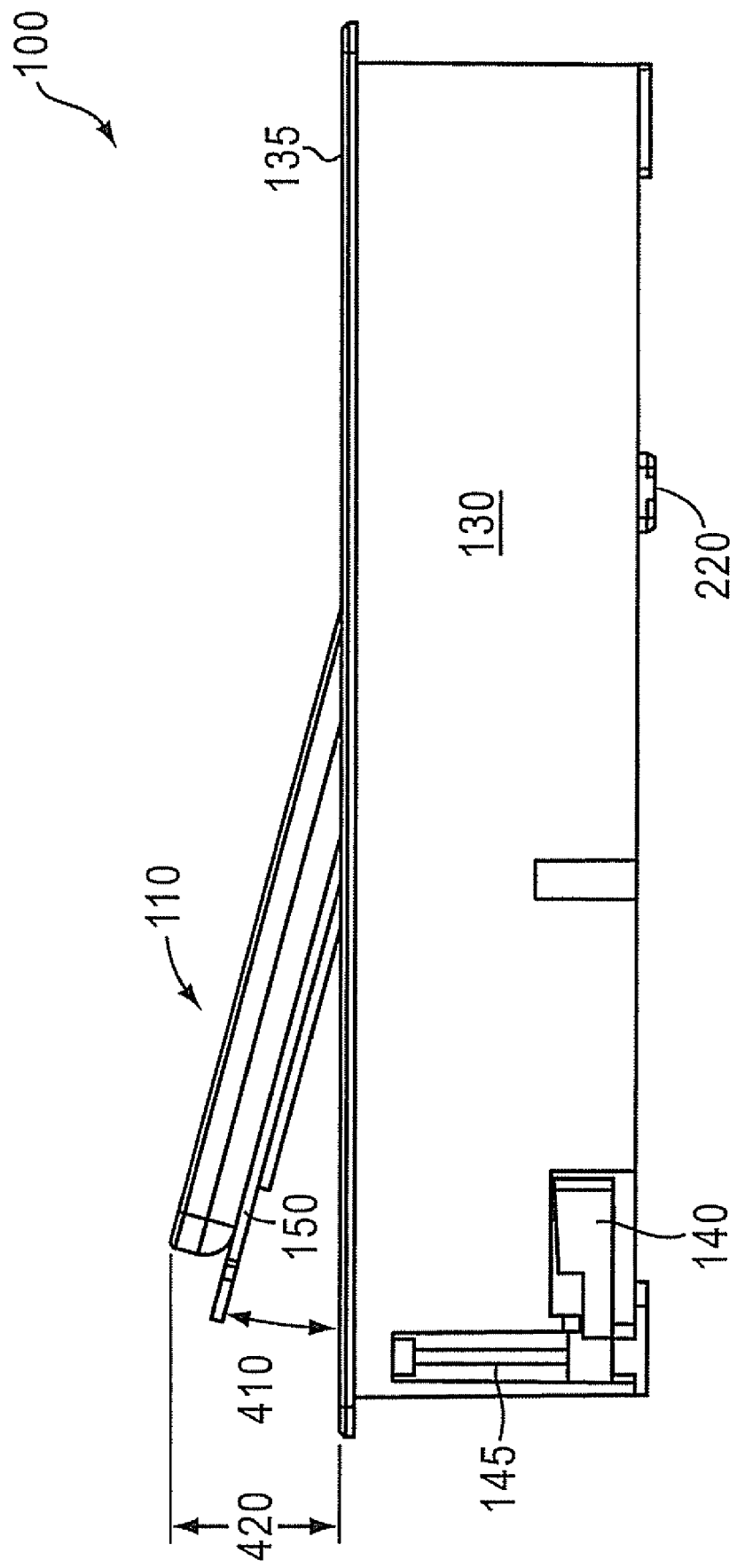
FIG. 4 is a side plan view of the example in-wall dock of FIG. 1, showing the tablet computer fully slid into the tilted receiving tray.
Figure 5:
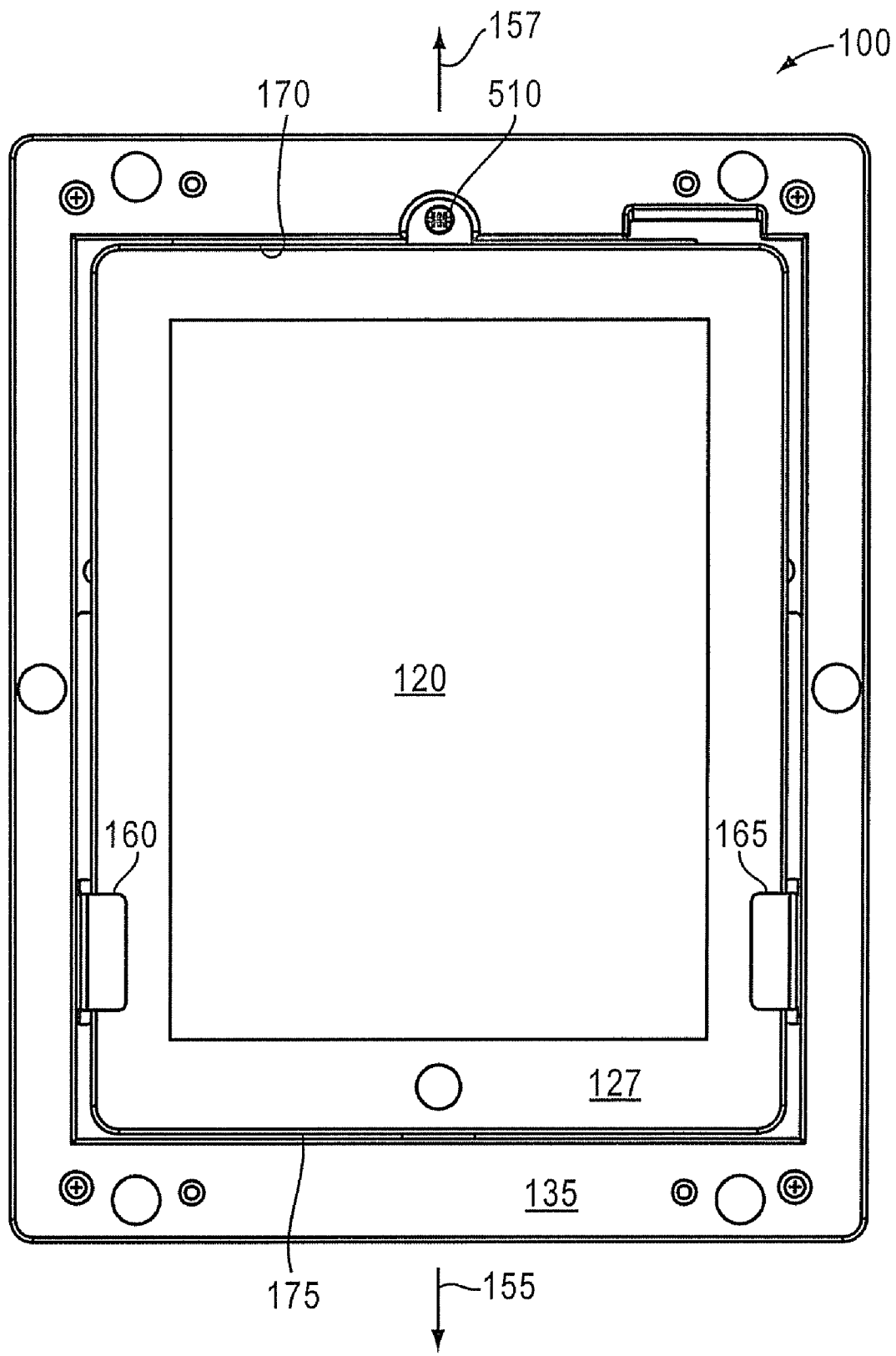
FIG. 5 is a front plan view of the example in-wall dock of FIG. 1, showing the tablet computer fully slid into the receiving tray and a lockdown mechanism engaged.

In reference to FIGS. 1-3, an example in-wall dock 100 may be configured to receive a tablet computer 110 having a touch-sensitive display screen 120. As used herein, the term "tablet computer" refers to a thin general-purpose computer that employs a touch-sensitive display screen operable by fingertips, a stylus, a digital pen, or similar implement as its primary input device, instead of a full-sized mechanical Qwerty keyboard or mouse. A tablet computer 110 may be an iPad™ tablet available from Apple Inc. of Cupertino, Calif., an HP Slate™ tablet available from Hewlett-Packard Co. of Palo Alto, Calif., a Sahara Slate™ PC available from Tablet-Kiosk Corp. of Torrance, Calif., or another device. Further, a tablet computer 110 may be a smaller sized device, for example, an iPod Touch® device available from Apple Inc., or another device having a smaller form factor.

The in-wall dock 100 comprises a housing 130 having opposing pairs of exterior side walls, a front face 135, and a back face 200. When secured in a wall (not shown), the front face 135 of the housing 130 is preferably arranged substantially parallel with the wall surface facing the room, and may overlap a portion of the wall, while the exterior side walls, and the back face 210, are disposed within the wall cavity (i.e., the stud bay). In the example embodiment, the housing 130 is sized to have a height 230 of approximately 11.2 inches, a width 240 of approximately 8.3 inches, and a depth (FIG. 7, 720) of approximately 2.5 inches, to accommodate an Ipad® tablet. It should be understood that, alternatively, the in-wall dock 100 may be differently sized, to accommodate a differently sized tablet computers 110. Further, while in the example embodiment the exterior side walls, and the back face 210, are shown to be substantially flat, in alternative configurations, they may be differently shaped, having projections, ventilation openings, and the like.

The in-wall dock 100 may be secured to the wall with an attachment mechanism, for instance, a plurality (e.g., four) mounting tabs 140. Each mounting tab 140 may be coupled to a corresponding bolt 145. While in a first position, suitable for installation, the mounting tabs 140 are retained within indents, retracted within the exterior side walls of the housing 130. After installation, a head of each bolt 145 may be rotated to draw the corresponding mounting tab 140 out of its indent, and forward to engage the interior face of the wall surface (e.g., the wall's drywall) Alternatively, a variety of other types of attachment mechanisms may be employed to secure the in-wall dock 100 to the wall and/or studs in the wall, including clips, fasteners (e.g., nails or screws), adhesives and other mechanisms.

In the example embodiment, one or more connectors are disposed in the housing 130 of the in-wall dock 100, the connectors being configured to couple to power and/or data cabling in the wall. For example, a 4-pin Phoenix connector 220 and a CATS cable connector (not shown) may be disposed on the back face 210 of the housing 130. Alternatively, a variety of other types of connectors may be employed, or wires may be simply fed through openings in the housing 130 and connect either directly, or indirectly, to the tablet computer 110. The power cabling in the wall may connect to an appropriate transformer that adjusts voltage to that required by the tablet computer 110. The data cabling in the wall may connect to a control system, for example, to a system employing a programmable multimedia controller. Further details describing an example programmable multimedia controller that may be used with the in-wall dock 100 are described in U.S. patent application Ser. No. 11/314,664 by Robert P. Madonna et al., entitled "System and Method for a Programmable Multimedia Controller", which is incorporated by reference herein in its entirety.

Internal wiring and/or circuitry (not shown) of the in-wall dock may connect the connectors either directly, or indirectly, to a connection plug (or plugs) (not shown). The connection plug (or plugs), in turn, couples to a port (or ports) 115 disposed on the tablet computer 110. In the example embodiment, where the tablet computer is an iPad™ tablet, a single male Apple® 30-pin dock connection plug is used to engage a female Apple® 30-pin connector on the tablet computer, however, it should be understood that, depending on the tablet computer 110 employed, a variety of other connectors or sets of connectors may be used.

In the example embodiment, a receiving tray 150 supports the connection plug and is otherwise configured to receive the tablet computer 110. The receiving tray 150 is rotatably mounted to the housing 130, by a pivot mechanism (not shown), for example, by pins extending into holes, disposed in the side walls of the housing 130. The receiving tray is configured to rotate from a first orientation that is disposed at an acute angle (FIG. 3) 410 (e.g., about 15 degrees) to the front face 135 of the housing 130, to a second orientation that is substantially parallel to the front face 135 of the housing 130. When in the first orientation the tablet computer 110 may extend a distance 420 from the front face 134 of the housing 130. One or more springs (not shown) may be employed to spring-load the receiving tray 150, such that it is urged into the first orientation unless otherwise restrained.

In reference to FIGS. 2-5, while the receiving tray 150 is positioned in the first orientation, a tablet computer 110 may be slid into the receiving tray 150, in a direction 155 parallel to a major axis of the tablet computer 110. When slid into the receiving tray 150, the table computer engages retaining flanges. In the example embodiment, first and second retaining flanges 160, 165 are employed that engage opposing sides of the tablet computer 110, and a portion of a front face 127 of the tablet computer 110, and substantially prevent movement of the tablet computer 110 in a directions normal to its major axis. However, it should be understood that, in alternative embodiments, differing numbers and arrangements of retaining flanges may alternatively be employed. Further, it should be understood that tablet computer 110 may be secured by other retaining mechanism(s), including various clamps, fasteners, Velcro, adhesives, and/or other mechanisms. Still further, while in the example embodiment the tablet compute 110 is slid into the receiving tray 150 in a direction along its major axis, it should be understood that the tablet computer 110 may alternatively be engaged with the receiving tray 150 in other manners, for example, slid into the receiving tray 150 in another direction, placed into it from above, or otherwise engaged with the receiving tray 150.

After the tablet computer 110 is engaged to the receiving tray 150, the receiving tray 150 is rotated to its second orientation, so that it is substantially parallel to the front face 135 of the housing 130. While in the second orientation, the front face 127 of the tablet computer 110 is disposed flush, or nearly flush, to the front face 135 of the housing 130. When so arranged, inner sidewalls (FIG. 7) 170, 175 of the housing engage opposing ends of the tablet computer 110, and substantially prevent movement of the tablet computer 110 in directions 155, 157 parallel to the major axis of the tablet computer 110.

A lockdown mechanism (FIG. 5) 510 secures, the receiving tray 150 in its second orientation, for example, restraining the spring loading of the receiving tray. As long as the lockdown mechanism 510 is engaged, the tablet computer 110 may not be removed, as it is retained in all directions, thereby preventing, or at least discouraging, unwanted removal or theft. Various types of lockdown mechanisms may be employed to provide greater, or lesser, levels of security. In the example embodiment, a fastener (e.g., a screw) extending through a portion of the receiving tray 150 into a projection of the housing 130 is employed as the lockdown mechanism 510. The fastener may have an uncommon head configuration, for example, a Robertson (square) head, an Allen (hex socket) head, a Torx or Security Torx head, a Tri-Wing head, a Spanner head, a Double hex head, a Bristol head, etc. that may discourage unwanted removal. In alternative embodiments, the lock down mechanism may take a different form, and, for example, may include a keyed lock set, a locking clip or clamp, or other mechanisms. While the lockdown mechanism may discourage unwanted removal, should the tablet computer 110 require removal, for example, for maintenance or replacement, the lockdown mechanism may permit such action.

In addition to the mechanical security provided by the lock down mechanism 510, an electronic removal detection system (not shown) may be employed to detect removal of the tablet computer 110. For example, insertion of the tablet computer 110 may close a contact closure (not shown) disposed in the housing 130, thereby completing an electric circuit. Removal of the tablet computer 110 may open the contact closure, thereby breaking the electric circuit. A control system, for example a programmable multimedia controller, in communication with the electronic removal detection system may recognize the contact opening and may initiate an appropriate response, for example, sound an alarm, deactivate the tablet computer 110, or perform some other action.

Figure 6:
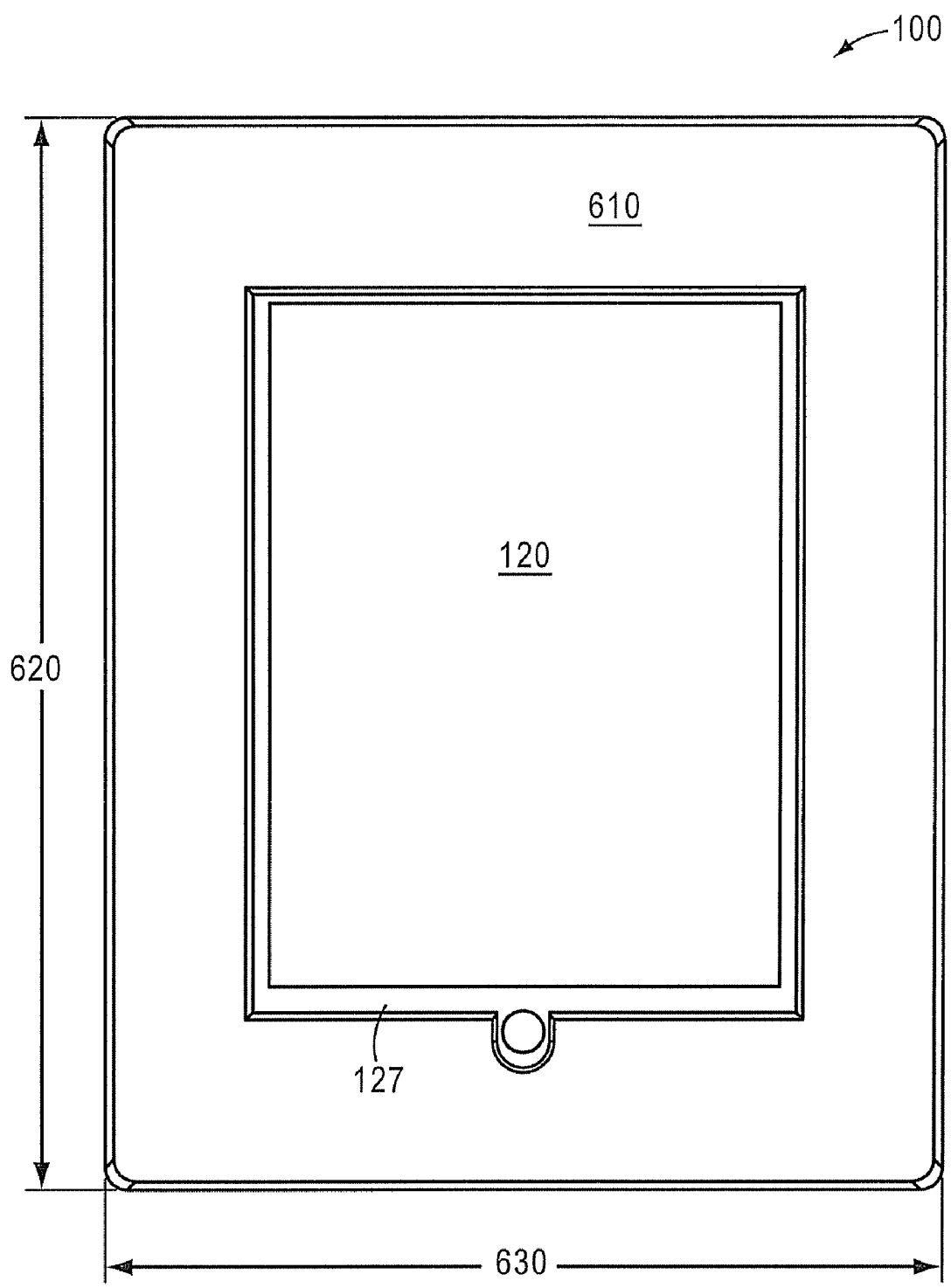
FIG. 6 is a front plan view of the example in-wall dock of FIG. 1, showing a bezel placed over a front face of the housing and a portion of the tablet computer.
Figure 7:
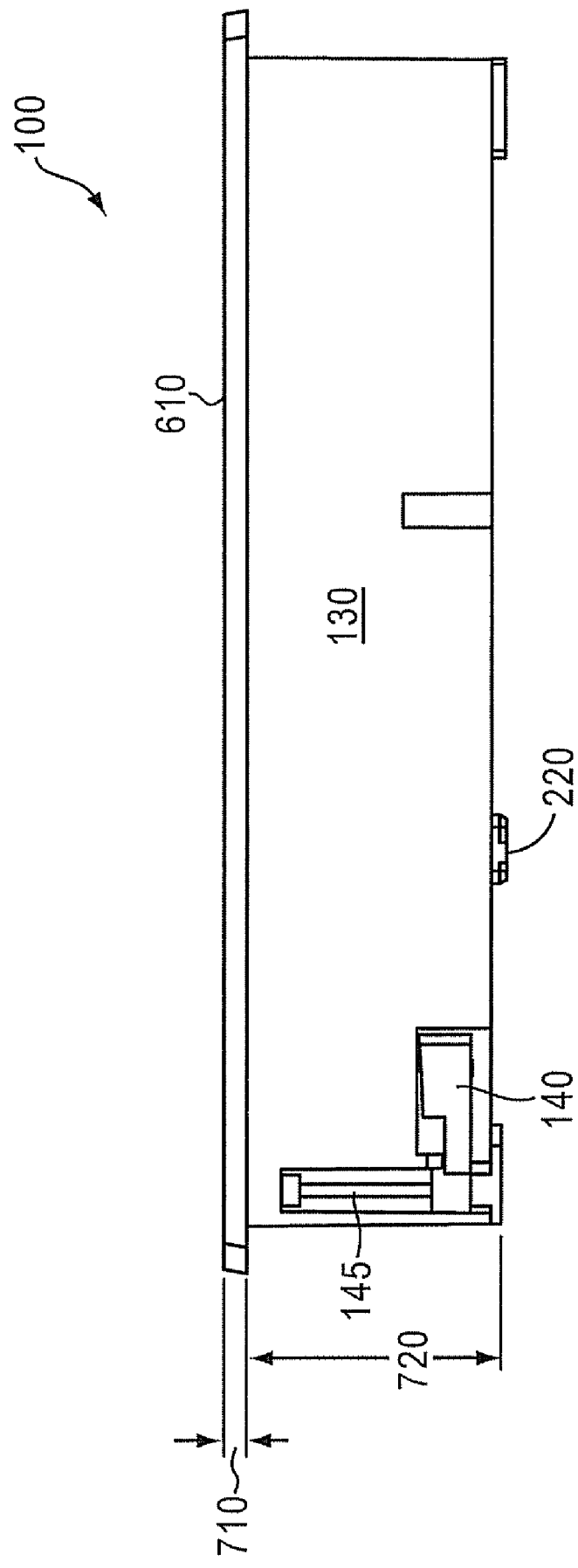
FIG. 7 is a side plan view of the example in-wall dock of FIG. 1, showing the bezel in place.

In reference to FIGS. 6 and 7, a bezel 610 may be secured over the front face 135 of the housing, a portion of the front face 127 of the tablet computer 110, and a portion of the wall surface of the wall surrounding the dock. In the example embodiment, the bezel 610 has an outer height 620 of approximately 12.1 inches, an outer width 630 of approximately 9.5 inches, and a depth (FIG. 7) 710 of approximately 0.12 inches. Further, the bezel 610 has an inner opening that terminates a small distance away from the touch-sensitive display screen 120 of the tablet computer 110, such that a limited region of the front face 127 of the tablet computer 110 is left exposed. In alternative embodiments, the bezel 600 may be differently sized, and, for example, may have inner dimensions that abut edges of the touch-sensitive display screen 120, or even cover a small periphery portion of the touch-sensitive display screen 120. A variety of bezels 610 of different sizes and shapes, made from different materials, and having different finishes or colors may be offered to suit different end user's tastes.

The bezel 610 is secured to the front face 135 via a removable attachment mechanism. In the example embodiment, the removable attachment mechanism includes a magnet closure, where a plurality of magnets (not show) affixed to the bezel 610 interact with opposing magnets (or ferrous metal plates) affixed to the housing 130. However, in alternative embodiments, the removable attachment mechanism may take a different form, and may include various clips, fasteners, Velcro, adhesives, or other mechanisms.

With the bezel 610 in place, the appearance of the tablet computer 110 in the in-wall dock 100 may approximate the appearance of a special-purpose in-wall touch panel control unit. That is, the tablet computer 110 in the in-wall dock 100 may appear as an integrated device. Since tablet computers are typically mass-market products, that are produced in large production runs having considerable economies of scale, a tablet computer may be rather inexpensive. Further, the manufacturing cost of the in-wall dock 100 may be low. Accordingly, the combined expense of a tablet-computer 110 and in-wall dock 110 may be considerably less than that of typical a special-purpose in-wall touch panel control unit.

Further, the combination of a tablet computer 110 and the above described in-wall dock 100 may offer other advantages. As discussed above, since the tablet computer 110 is removable (with some effort), it can be readily replaced in case of failure or to provide an upgrade. Still further, use of the in-wall dock 100 may streamline installation. A tablet computer 110 may be configured or programmed offsite by an installer, and simply placed within an installed in-wall dock 100 on-site, thereby reducing on-site configuration time.

While the above description discusses certain example embodiments, it should be apparent that a number of modifications and/or additions may be made thereto. While in the example embodiment, the in-wall dock 100, including the housing 130 and the receiving tray 150, are constructed primarily of plastic, the in-wall dock 100 may be constructed from a variety of other materials and/or combinations of materials, including metals, composites, woods, and other materials. Further, it should be understood that the in-wall dock 100 may be oriented in various orientations in the wall, for example, to provide a portrait orientation or a landscape orientation.

Therefore, it should be understood that the above descriptions are meant to be taken only by way of example.

What is claimed is:

1. An in-wall dock for a tablet computer, comprising:
   a housing configured to be at least partially disposed within a wall cavity of a wall of a structure, the housing including a front face that, when the housing is disposed within the wall cavity, is arranged substantially parallel with a wall surface of the wall;
   an attachment mechanism configured to engage the wall surface to prevent movement of the housing with respect to the wall when disposed within the wall cavity;
   a receiving tray rotatably mounted to the housing, the receiving tray configured to rotate from a first orientation disposed at an acute angle to the front face of the housing that permits engagement of the tablet computer with the receiving tray, to a second orientation that is substantially parallel to the front face of the housing and prevents removal of the tablet computer from the receiving tray;
   a lock down mechanism configured to, when engaged, retain the receiving tray in the second orientation, the lock down mechanism requiring use of a separate tool or key to be disengaged; and
   a removable bezel configured to secure over the housing, and, when so secured, to cover at least a portion of a front face of the housing and at least a portion of a front face of the tablet computer.

2. The in-wall dock for a tablet computer of claim 1, wherein the lock down mechanism comprises:
   a fastener that extends through a portion of the receiving tray into a projection of the housing.

3. The in-wall dock for a tablet computer of claim 1, further comprising:
   one or more retaining mechanisms configured to retain the tablet computer to the receiving tray and substantially prevent movement of the tablet computer with respect to the receiving tray in directions normal to a major axis of the tablet computer.

4. The in-wall dock for a tablet computer of claim 3, wherein the one or more retaining mechanisms comprise:
one or more retaining flanges.

5. The in-wall dock for a tablet computer of claim 1, further comprising:
first and second inner sidewalls of the housing configured to engage opposing ends of the tablet computer and substantially prevent movement of the tablet computer in directions parallel to a major axis of the tablet computer.

6. The in-wall dock for a tablet computer of claim 1, wherein the bezel, when secured, also covers at least a portion of the wall surface of the wall.

7. The in-wall dock for a tablet computer of claim 1, further comprising:
a magnet closure configured to removably attach the bezel to the housing.

8. The in-wall dock for a tablet computer of claim 1, further comprising:
an electronic removal detection system configured to detect removal of the tablet computer from the in-wall dock.

9. The in-wall dock for a tablet computer of claim 8, wherein the electronic removal detection system comprises a contact closure that is opened when the tablet computer is removed from the in-wall dock, thereby breaking an electric circuit.

10. The in-wall dock for a tablet computer of claim 1, further comprising:
a male 30-pin dock connection plug configured to engage a female 30-pin connector on the tablet computer.

11. An in-wall dock for a tablet computer, comprising:
a housing configured to be at least partially disposed within a wall cavity of a wall, the housing including a front face that, when the housing is disposed within the wall cavity, is arranged substantially parallel with a wall surface of the wall;
an attachment mechanism configured to engage the wall surface to prevent movement of the housing with respect to the wall when disposed within the wall cavity;
a receiving tray mounted to the housing, the receiving tray configured to engage the tablet computer;
a lock down mechanism coupled to the receiving tray and configured to, when engaged, and in conjunction with the receiving tray, retain the tablet computer and substantially prevent the tablet computer's removal from the in-wall dock, the lock down mechanism requiring use of a separate tool or key to be disengaged; and
a bezel configured to cover at least a portion of a front face of the tablet computer.

12. The in-wall dock for a tablet computer of claim 11 wherein the receiving tray is rotatably mounted to the housing, and is configured to rotate from a first orientation disposed at an acute angle to the front face of the housing that permits engagement of the tablet computer with the receiving tray, to a second orientation that is substantially parallel to the front face of the housing.

13. The in-wall dock for a tablet computer of claim 11, wherein the lock down mechanism comprises:
a fastener that extends through a portion of the receiving tray into a projection of the housing.

14. The in-wall dock for a tablet computer of claim 11, further comprising:
a magnet closure configured to removably attach the bezel to the housing.

15. The in-wall dock for a tablet computer of claim 11, further comprising:
an electronic removal detection system configured to detect removal of the tablet computer from the in-wall dock.

16. The in-wall dock for a tablet computer of claim 11, further comprising:
a male 30-pin dock connection plug configured to engage a female 30-pin connector on the tablet computer.

17. An in-wall dock for a tablet computer, comprising:
means for housing configured to be at least partially disposed within a wall cavity of a wall;
means for attaching configured to prevent movement of the housing with respect to the wall when disposed within the wall cavity;
means for receiving the tablet computer, the means for receiving the tablet computer configured to rotate from a first orientation that permits engagement of the tablet computer with the means for receiving, to a second orientation that prevents removal of the tablet computer from the means for receiving; and
means for covering configured to secure over the means for housing, and, when so secured, to cover at least a portion of a front face of the means for housing and at least a portion of a front face of the tablet computer.

18. The in-wall dock for a tablet computer of claim 17, further comprising:
means for electronically detecting removal of the tablet computer from the in-wall dock.

19. The in-wall dock for a tablet computer of claim 17, further comprising:
a male 30-pin dock connection plug configured to engage a female 30-pin connector on the tablet computer.

20. The in-wall dock for a tablet computer of claim 17, further comprising
means for locking down configured to, when engaged, retain the tablet computer and substantially prevent the tablet computer's removal from the in-wall dock, the means for locking down requiring use of a tool or key to be disengaged.

* * * * *

UNITED STATES PATENT AND TRADEMARK OFFICE
CERTIFICATE OF CORRECTION

PATENT NO. : 8,369,082 B2
APPLICATION NO. : 12/850429
DATED : February 5, 2013
INVENTOR(S) : Robert P. Madonna et al.

Page 1 of 1

It is certified that error appears in the above-identified patent and that said Letters Patent is hereby corrected as shown below:

In the Specification:

Col. 3, line 57 should read:
220 and a ~~CATS~~ CAT5 cable connector (not shown) may be dis- Signed and Sealed this
Twenty-fifth Day of June, 2013

Teresa Stanek Rea
*Acting Director of the United States Patent and Trademark Office*